United States Patent Office 3,084,172
Patented Apr. 2, 1963

3,084,172
HIGHER ALKYL ONIUM SALTS OF GRAPHITIC OXIDE
Delmar H. Larsen, West Hollywood, Calif., assignor to National Lead Company, New York, N.Y., a corporation of New Jersey
No Drawing. Filed June 21, 1954, Ser. No. 438,327
4 Claims. (Cl. 260—348)

This invention relates to derivatives of graphitic oxide, and more particularly to chemical compounds thereof which have the property of dispersing and swelling with gel formation in organic liquids; and in addition, to useful compositions containing the derivatives described.

In many fields of technology, particularly chemical technology, it is necessary or desirable to impart structural viscosity to a system which includes an organic liquid. Such systems are, for example, oils, where it may be desired to make a grease therefrom, paints, varnishes, lacquers, adhesives, inks, hydraulic fluids, waxes and the like. Expedients avaibale to the art have heretofore included the addition of such materials as soaps, including fatty acid, rosin, and naphthenate soaps, rubber and other synthetic polymers, inorganic fillers such as finely divided silica, derivatives of bentonite, and the like. In most if not all cases, the results obtainable with such builders are never perfect, and generally leave something to be desired.

It is an object of the present invention to provide a material for increasing consistency in organic systems which is effective in relatively small concentrations, and maintains its effectiveness over a wide temperature range.

A further object of the invention is to provide a material capable of forming gels with organic liquids and systems containing organic liquids, which material is ash free, and contains no abrasive component.

Another object of the invention is to provide a material for thickening organic liquid systems which is completely organic, and can be made without the inclusion of metallic ions, silicon atoms or the like.

A further object of the invention is to provide novel and useful derivatives of graphitic oxide.

Another object of the invention is to provide thickened and re-enforced systems such as greases, paints, adhesives, hydraulic fluids, waxes, and the like, of superior properties.

Other objects of the invention will become apparent as the description thereof proceeds.

In accordance with the invention, graphitic oxide, or a material rich in graphitic oxide, such as a mixture of graphite and graphitic oxide, is reacted with an organic material which includes a hydrophobic portion in such a way that the graphitic oxide becomes substantially hydrophobic and oleophilic. An explanation of the nature of graphitic oxide is helpful in understanding how this is accomplished.

Graphitic oxide is commonly prepared as a derivative of graphite, although it may be made in a variety of ways. Graphite itself, as is well known, consists of a layer structure in which the individual layers are composed of sheets of carbon atoms in a planar hexagonal array, each layer being but one atom thick, but extending in two dimensions for hundreds or even thousands of carbon atoms, depending upon the size of the flake containing the layer. The individual layers are rather loosely held together, and the unctuous nature of graphite is attributable to the ability of one layer to slide relative to its neighbor, as a consequence of the very weak bond between them. By suitable oxidizing treatment, graphite may be converted into a material containing almost half as many oxygen atoms as there are carbon atoms, such products being known as graphitic oxide or graphitic acid; the two terms are synonymous. The oxidizing treatment can be accomplished by the use of chlorates, perchlorates, permanganates, chromic acid, chlorine dioxide, and others, generally with the graphite or graphitic material to be treated suspended in concentrated sulphuric acid. Some of the oxidizing treatments used in the activation of carbon also bring about a conversion, to a greater or lesser extent, of carbon in its graphitic form to that of graphitic oxide. The method generally used is that described by Staudenmaier in Berichte der deutsch. Chem. Gesell., 31, 1481–1487 (1899), using potassium chlorate in a mixture of sulphuric acid and nitric acid, and using ordinary flake graphite as the starting material. While of course the oxidation process can be interrupted before substantially complete or at least equilibrium conversion of the graphite has taken place, allowing the various preparative methods to run their normal course on graphites generally results in the production of a graphitic oxide containing from about 53 to 64% carbon, 9 to 12% water, and 20 to 34% oxygen, with an atomic ratio of carbon to oxygen ranging from about 3.5 to close to 2, generally not lower than about 2.15. It is considered that a minor proportion of the oxygen in graphitic oxide exists as carboxyl groups, either at the edges of the layers or possibly at the edges of holes in the layer sheet which may have been caused by the attack of the oxidizing agent. By far the greater proportion of oxygen occurs, however, on both sides of the flat surfaces of the sheets, for the most part as oxygen atoms bonded to two adjacent carbon atoms in an epoxy type of linkage. Some of the oxygen may also exist as hydroxyl groups bonded to a single carbon atom, and it is evident that there will be a tendency of epoxy oxygen to become hydrolyzed to two adjacent hydroxyl groups when the graphitic oxide is subjected to the action of hydrolyzing agents.

It has been found that graphitic oxide can accept cations, particularly at alkaline pH's, whence arises the name of "graphitic acid." Such carboxyl groups as are present of course behave in the fashion normal for carboxyl groups in organic acids, generally, and will react at fairly low pH values. In ordinary graphitic oxide preparations, the amount of cation acceptance of the acid, that is, the extent to which it is neutralized by alkalis such as for example sodium hydroxide or calcium hydroxide, up to a pH of 6 or 7 (and this is attributed to neutralization of the carboxyl groups), is of the order of magnitude of one milliequivalent of cation per gram of graphitic oxide. However, the hydroxyl groups, and the epoxy oxygen atoms when hydrolyzed to hydroxyl groups, apparently as a result of their being bonded to carbon atoms which are in an essentially aromatic configuration, have the nature of phenolic hydroxyl groups rather than aliphatic hydroxyl groups, and at moderately alkaline pH values, from say 8 to 12 and even 8 to 10, will also accept cations in a neutralization process, to the extent of 2 or 3 or 4 additional milliequivalents per gram of graphitic oxide, so that the total cation acceptance of graphitic oxide can amount to from 2 to 5 milliequivalents per gram. However, graphitic oxide is reactable not only with cations in a neutralization type of reaction, but is also, by virtue of the hydroxyl or potential hydroxyl groups, susceptible to etherification and esterification, whereby the oxygen atoms bonded to the carbon layers can become coupled to organic materials through, for example, ether and ester linkages and the like.

The distance between two adjoining carbon atoms in a layer of graphite is 1.417 angstrom units; this distance is ever so slightly larger, about 0.9% greater, in most preparations of graphitic oxide. It can be readily calculated, then, that the area on the surface of the graphitic oxide layer available to a substituted cation, or, as the case may be, an organic radical coupled by etherification, or the like, is about 288 square angstrom units when the extent of substitution is one milliequivalent per gram, 144 square angstrom units when the extent of substitution is 2 milliequivalents per gram, about 96 square angstrom units for 3 milliequivalents per gram, and so on.

I have found that if an organic radical containing a hydrophobic portion equivalent to a saturated aliphatic chain of about 10 carbon atoms, or a larger hydrophobic portion, is coupled to graphitic oxide, and the extent of such reaction is enough to give fairly complete coverage of the surface of the graphitic oxide with hydrophobic groups or portions of radicals, then the graphitic oxide will readily disperse in organic liquids, generally with gel formation. The gels will in many cases even be thixotropic. The method of coupling may for example be one of the two general ways suggested above; the organic radical may be reacted as part of an organic cation, for example as an amine salt, or more broadly an onium cation, for example, as laurylammonium ion, in which case the reaction will be one of neutralization of an acid by a base; or the organic radical may be coupled by covalent linkages such as by etherification, for which purpose a number of expedients are available, well known to organic chemists. Particular examples illustrative thereof will be given below.

For optimum results, the extent to which the reaction of the graphitic oxide with the organic compound containing a hydrophobic group or groups is carried out should be such that substantial coverage of both surfaces of the graphitic oxide flakelet by hydrophobic groups is had. For example, when tetradecylammonium chloride was reacted at a pH of 7 with graphitic oxide in aqueous suspension, maximum swelling of the complex thus formed, when tested in a mixture of 90% toluene and 10% methanol, was obtained with approximately two milliequivalents of the long chain ammonium compound for each gram of graphitic oxide used. From the data set forth hereinabove, it is evident that about 144 square angstrom units were available for each of the tetradecylammonium cations, and since these have an area which may be calculated to be about 106 square angstrom units, it will be seen that roughly three-quarters of the available surface of the graphitic oxide flakelet was covered by the organic cation, of which the greater part was hydrophobic. The swelling, which was spontaneous, amounted to 23 cubic centimeters per gram of graphitic oxide derivatives. It is evident that lesser or greater degrees of coverage of the graphitic oxide with the organic hydrophobe can be carried out and some of the advantages of the invention will be retained. The table below illustrates this for the case of the tetradecylammonium complex just described:

*Table 1*

| Millieq. of amine per gram of graphitic oxide | Swelling in cc. per gram in 90% toluene-10% methanol |
|---|---|
| 1.0 | 11 |
| 1.5 | 19.5 |
| 2.0 | 23 |
| 3.0 | 16.5 |
| 4.0 | 12 |

It will be evident that organic materials containing hydrophobe groups of different size may be utilized, and indeed as the hydrophobe group per organic cation or organic radical is larger, fewer need be reacted with the graphitic oxide to obtain the desired degree of development of oleophilic properties in the final product. Thus, for example, when dimethyllaurylcetylammonium bromide is reacted with graphitic oxide, a swelling of about 40 cubic centimeters per gram of material is obtained at a neutralization of the graphitic oxide amounting to as little as one milliequivalent per gram. Where an organic material is used in which the hydrophobe character is obtained with a 10-carbon atom chain, then reaction of the graphitic oxide to the extent of about three milliequivalents of the organic material per gram of graphitic oxide will result in a suitably oleophilic product. Organic materials containing solely hydrophobic groups equivalent to a saturated aliphatic hydrocarbon chain of less than about 9 or 10 carbon atoms are not particularly recommended, not because insufficient of the organic radicals can be reacted with the graphitic oxide, but principally because a hydrocarbon chain of that length is scarcely definitely hydrophobic enough for the purposes at hand.

For the purposes of this invention, "oleophilic" is taken as synonymous with "hydrophobic," for the radicals possessing one property and useful in the invention likewise possess the other property. While "oleophilic" possibly comes closer to a positive statement of the feature necessary, "hydrophobic" is in more common use, and is therefore generally used throughout this specification.

In selecting hydrophobic groups, the principles which have been laid down in characterizing the degree of hydrophobicity in surface active agents generally will be found valuable. For example, a benzene ring is less hydrophobic than a cyclohexane ring; and double bonds generally, even in a long chain hydrocarbon, detract somewhat from completely hydrophobic character. On the other hand, these properties can be offset by increase in size. Thus, abietic acid contains a suitably hydrophobic group even though it lacks a hydrocarbon chain as such of length greater than three carbon atoms and moreover has a couple of double bonds present in rings. It possesses 19 carbon atoms in its hydrocarbon portion, however, which suffice to impart hydrophobic character. The hydrophobic portion of abietic acid can be used in the present invention by direct esterification of the acid with graphitic oxide, or by more readily converting the abietic acid to the amine and neutralizing the graphitic oxide so produced. Again, $\alpha$-dimethyl $\gamma$-dimethylbutylphenoxyethoxyethyldimethylamine, when reacted with graphitic oxide in the manner set forth, and here again about two equivalents per gram are suitable, gives a product of good swelling properties in organic liquids. Here, the chain contains enough hydrocarbon groups that it is suitably hydrophobic, i.e., oleophilic.

The book entitled "Surface Active Agents," by Schwartz and Perry, Interscience Publishers, Inc., New York, 1949, gives a very full discussion of chemical structure as related to oleophilic, that is, hydrophobic nature. Reference is hereby made to this book. Schwartz and Perry characterize hydrophobic radicals structurally as constituting "an elongated portion of low residual affinity." The section entitled "Classification of Hydrophobic Groups" on pages 17–20 of the book by Schwartz and Perry is especially referred to. The groups possessing low residual affinity and having oleophilic and hydrophobic properties are, among others, straight alkyl chains of eight to eighteen or more carbon atoms as derived from natural fatty acids; lower alkyl groups of from three to eight carbon atoms having more than two nuclei such as benzene or naphthalene; branched chain polymers of propene, isobutene, and some of the isomers of pentene and hexene with a total of from eight to twenty or more carbon atoms as derived especially from kerosene, light oil, and paraffin wax fractions; the hydrocarbon radicals of the naphthenic acids obtained from petroleum in the normal course of refining; the higher alcohols and hydrocarbons obtained by the Fischer-Tropsch synthesis; the hydrocarbon radicals of the rosin acids, as mentioned; terpenes and the radicals of the terpene alcohols.

Where any of the above hydrophobic groups, or indeed others, are joined to graphitic oxide in the manner described by means of an ester linkage, then it is convenient to form the simple carboxylic acid from the radical to be used, and esterify this with the graphitic oxide. Coupling of the radical by the diazo reaction may also be employed. Where the reaction is carried out by base exchange, then the radical may be made into an organic base, which is most conveniently an onium, such as ammonium, phosphonium, sulphonium, stibonium, arsonium, or oxonium. Thus, using the dodecyl radical as an example, one may use lauric acid and esterify, or one may use lauryl amine, which when converted to the onium form results in the lauryl onium ion (or dodecylammonium ion) which will base exchange with graphitic oxide; or in an analogous manner one may provide lauryl phosphonium salts, lauryl sulphonium salts, lauryl oxonium salts, such as lauryl dimethylgammapyrone, and the like.

Additional compounds which may be used for a reaction with graphitic oxide in the manner described are the following:

*Table II*

Octylammonium bromide
Nonylammonium acetate
Decylammonium bromide
Undecylammonium propionate
Dodecylammonium bromide
Hexadecylammonium bromide
Octadecylammonium bromide
Abietylammonium bromide
Oleylammonium iodide
Trimethyldodecylammonium bromide
Dimethyldidodecylammonium bromide
p-Octylaniline chloride
Triphenylcetylphosphonium bromide
Ditetradecylethylsulfonium iodide
p-Nonylpyridinium bromide
Ditetradecyl γ-pyrone It will be evident that the above table is representative, without being exhaustive. A complete listing of all reagents useable for base exchange reaction with graphitic oxide, by each and every possible compound would be unduly long, and in addition is not necessary here, because the principles underlying the selection of useable agents have been laid down herein in general terms. Particularly, it will be appreciated that when onium salts, such as are listed in Table II, react with graphitic oxide by base exchange reaction, the anion of the onium salt is liberated, and can be washed out of the product as the acid or as a simple salt of the acid. For example, if octylammonium bromide is used, hydrogen bromide is liberated upon base exchange reaction. Thus, it largely is a matter of indifference as to which anion is used, and the anions listed in Table II, while representative, are merely illustrative.

It will also be evident that a completely converted graphitic oxide is not necessary for use as a starting material, that is, the ratio of carbon to oxygen in the graphitic oxide used need not be as low as 2.5 or the even lower figures which have been obtained upon careful and prolonged oxidation of graphite. There is, so to speak, cation and organic radical acceptance capacity to spare in the ordinary graphitic oxide, and using the ordinary hydrophobic materials available such as the aliphatic amines of 9 to 10 or more carbon atoms; and it is possible either to use a graphitic oxide of a carbon-to-oxygen atomic ratio of say 2.5 and leave some of the acceptance capacity of the oxide unused, as is the case when only 2 or 2½ milliequivalents of organic material are added per gram of graphitic oxide; or the graphite can be oxidized to a lesser degree to begin with, for example, a carbon to oxygen ratio of 3.5 or even 4. Of course, as the equivalent weight of the organic material used approaches the lowest value, for example that of decylamine or a straight decyl chain, or, otherwise stated, as the area of the hydrophobic portion of the organic radical becomes smaller, it will be necessary to react a larger number of these per unit area, and therefore per unit weight of the graphitic oxide, so that in all cases the oxidation of the graphite must be carried out to a sufficient extent to provide acceptance capacity for the particular hydrophobic agent at hand. It will be clear that when the term "equivalent" is used here, it applies not only to organic cations, used for attachment to graphitic oxide by neutralization reaction, but also to a radical joined by covalent linkages, such as for example by etherification.

It is also within the scope of the invention that different methods of coupling organic groups to the graphitic oxide can be used on the same preparation. For example, graphitic acid may be partially coupled to an aliphatic chain to the extent of say perhaps one milliequivalent per gram by, for example, an ether linkage brought about by a diazoalkane, and the product thus obtained may be further coupled by a neutralization reaction using, for example, dihexadecyldimethylammonium bromide.

A particular method of bringing about an ether linkage which has been found to be of considerable practical value is to use thionyl chloride in order to form a graphitic oxide chloride, which can then be reacted with an alcohol containing a suitable hydrophobic radical, by loss of hydrogen chloride to form an ether linkage. Specific example of how this can be carried out will be given hereinbelow. Just as is the case with the base exchange reaction type of product, the useable alcohols here are many; some of those which can be used are given in the table which follows:

*Table III*

| Octyl alcohol | Hexadecanol |
|---|---|
| Nonyl alcohol | Octadecanol |
| Lauryl alcohol | Abietyl alcohol |
| Para 2-ethylhexy menthol | Paradecylbenzyl alcohol |

Also, it is not necessary in all cases to start with pure graphite recognizable as such by ordinary inspection in the preparation of the graphitic oxide base material. For example, in view of the fact that many lamp blacks and carbon blacks have a fairly well developed graphitic structure, and since complete oxidation of the graphite is not required for hydrophobe coupling, starting materials may for some purposes be lamp blacks and carbon blacks which are then subjected to a mild oxidative treatment. (Particularly suitable are carbon blacks and lamp blacks which have been graphitized by heating in the absence of air at about 2700° C. to about 3000° C. Such graphitized carbon blacks have been prepared under the name of "Graphon" by the Godfrey L. Cabot Company, of Boston, Massachusetts.) Subsequent coupling, particularly when a carbon to oxygen ratio of about 4 or less has been developed, with organic compounds within the purview of this invention, will result in the production of the materials giving good dispersibility in organic systems with generally some gel formation. Such products are particularly useful as fillers in systems such as natural and synthetic rubbers and elastomers, and in some types of greases. Graphitic oxide may also be obtained from other than purely carbonaceous materials; for example, in known manner from humic acids such as are available in lignite, particularly weathered lignite.

Examples of the preparation of suitable reaction products of graphitic oxide are as follows:

*Example 1.*—Graphitic oxide, prepared by the oxidation of graphite in concentrated sulphuric acid suspension and having a carbon-to-oxygen ratio of 2.89, was suspended in water at a pH of 7, precipitated with an excess of laurylammonium chloride, washed free of the excess ammonium salt and dried. When a one gram sample was placed in an excess of a 90%toluene–10% methanol mixture it swelled to a gel volume of 22.4 cc.

*Example 2.*—The process of Example 1 was carried out except using dimethyllaurylcetylammonium bromide; a gel volume of 41 cc. was obtained under like conditions.

*Example 3.*—A quantity of graphitic oxide of yellow color and having a carbon-to-oxygen ratio of about 2.6 was prepared by oxidation of graphite in sulphuric acid using nitrates and permanganates. A reaction product was made by taking 13.5 liters of an aqueous suspension containing 10.0 grams of this graphitic oxide and adding 17.6 grams of dimethyldioctadecylammonium chloride of commercial grade, having a combining weight of 600, suspended in 200 ml. of water, at room temperature. Coagulation occurred upon addition of the amine salt solution and the flocculent precipitate was washed, dried, and pulverized to pass a 50 mesh sieve.

*Example 4.*—With both reactants in aqueous suspension, 12 milliequivalents of triphenyl-n-dodecylphosphonium bromide were reacted with five grams of graphitic oxide, both in suspension, at a pH of 3.6. After filtering, drying and grinding, it was found that one gram of the sample had a gel volume of 39 ml. in a mixture of 90% toluene–10% methanol.

*Example 5.*—10 milliequivalents of any of the compounds listed in Table II hereinabove is reacted with five grams of graphitic oxide as has been described in Example 4 hereinabove. The reaction product is separated by decantation and filtration, washed, and dried.

*Example 6.*—Two grams of graphitic oxide, having a carbon-to-oxygen ratio of about 2.7, was dried for two days at 110° C. and then suspended in 150 ml. of anhydrous ether and refluxed for twenty-four hours while being agitated. After cooling, 30 ml. of thionyl chloride diluted with 17 ml. of ether was slowly added to the mixture in the flask, evolution of gas following. The mixture was refluxed for six hours, then cooled and air was drawn slowly through the apparatus for the next twenty-four hours. The excess liquid mixture of thionyl chloride and ethyl ether was removed through a glass tube with a fritted glass end. The remaining contents of the flask were washed three times with dry ether, then heated at 95° C. for a day under a vacuum of 26 mm. of mercury to remove excess liquid. The graphitic oxide chloride thus obtained was suspended in decyl alcohol and the reaction mixture heated to 100° C. until hydrochloric acid was no longer given off, which took about four hours. The excess alcohol was filtered off and the material washed several times with ether. One gram of the product, representing a decyl ether of graphitic oxide, was found to swell to a gel volume of 10 ml. in a mixture of 90% toluene–10% methanol.

*Example 7.*—The procedure of Example 6 was repeated except that tetradecyl alcohol was used instead of decyl alcohol. A final product representing the tetradecyl ether of graphitic oxide was obtained. One gram of this product swelled to a gel volume of 10 ml. in a mixture of 90% toluene–10% methanol.

*Example 8.*—The procedure of Example 7 is carried out using any of the compounds of Table III in place of the decyl alcohol. A reaction product is obtained representing the hydrophobic radical of the compound of Table III used, joined through an ether linkage to the graphitic oxide.

*Example 9.*—Dimethyllaurylcetyl ammonium graphitic oxide was prepared by reacting dimethyllaurylcetyl ammonium bromide in aqueous suspension with graphitic oxide in aqueous suspension in the ratio of 0.25 equivalent of the quaternary salt per 100 grams of graphitic oxide. Flocculation and precipitation followed the reaction, whereupon the product was cooled, dried, and ground. One gram of the product swelled to a volume of 41 ml. in a mixture of 90% toluene–10% methanol.

*Example 10.*—One gram of weathered North Dakota lignite was suspended in 100 ml. of 3% sodium hydroxide, filtered through a fritted glass crucible, and the suspension neutralized with sulphuric acid. Next the solution was saturated with boric acid and one ml. of 0.1 molal copper sulfate was added before placing it on a bath maintained at 75° C. 50 ml. of 30% hydrogen peroxide was added to the hot mixture which was then stirred for fifteen minutes. The mixture was cooled and one milliequivalent of triphenyl-n-dodecylphosphonium bromide was added. The product thus obtained was found to swell in nitrobenzene to a gel volume greater than 30 ml. per gram.

*Example 11.*—The operations of Example 10 were carried out, except that dimethyllaurylcetylammonium bromide was used instead of the phosphonium salt. Again a product was obtained which was found to swell in nitrobenzene to a gel volume greater than 30 ml. per gram.

*Example 12.*—Tetradecylammonium chloride was reacted with water suspensions of graphitic oxide (of pH 7.0) at a number of different onium:oxide ratios. The products were isolated by filtration and dried in an oven for 12 hours at 65° C. The resulting products were then ground and tested for their ability to swell in a 90% toluene–10% methanol mixture. The resulting gel volumes were as follows:

| Milliequivalents of tetradecylammonium chloride per gram of graphitic oxide | Gel volume of one-gram sample of reaction product |
| --- | --- |
| 0.25 | 5 |
| 1.0 | 11 |
| 1.5 | 19.5 |
| 2.0 | 23 |
| 3.0 | 16.5 |
| 4.0 | 12 |

As has been stated, the products of this invention are useful for thickening and adding consistency to all manner of organic systems containing a liquid, semi-liquid or liquefiable phase. They may be used in proportions sufficient to impart the desired properties to oils, waxes, paints, adhesives, hydraulic fluids, printing inks, putties, liquid fuels, and the like. The proportions to be used depend upon the degree of alteration desired of the properties of the base material to which the product is added. For example, small amounts, of the order of $\frac{1}{10}$ to $\frac{1}{2}$ percent, when added to lubricating oils bring about a substantial improvement in the viscosity index of the oil, that is, the change of viscosity with temperature is diminished. Larger amounts of the same products of this invention added, for example, to the same lubricating oils, which may be mineral oils or synthetic lubricants, in the proportion of 5% to 20%, result in the production of lubricating greases. 5% to 10% by weight can be added to solvent mixtures of the paint-remover type in order to produce a gelled paint remover. From 5% to 30% or more can be incorporated in waxes in order to increase the tensile strength of the wax and raise the melting point thereof. Here, the incorporation is best made with the wax in a molten condition.

Some specific examples of the use of the products of the invention in organic systems will now be given.

*Example A.*—Twenty grams of dimethyllaurylcetylammonium graphitic oxide as produced in Example 2 hereinabove, was mixed with 80 grams of white mineral oil and milled, two drops of methanol being used as a dispersion aid. A grease was formed which was non-melting at temperatures below approximately 450°–500° C. Beyond this temperature range, the grease combusts with 100% ignition loss.

*Example B.*—Ten grams of the product of Example 3 was passed twice over a three-roll paint mill with 20 grams of coastal stock oil, 1021 SUS, VI–68, whereupon the product was diluted with an additional 20 grams of oil to give a 20% concentration and this mixture was also passed twice over the mill. The resulting grease had an unworked penetration of 140 as measured on a penetrometer fitted wtih a standard grease penetration cone.

*Example C.*—A sample of toluene was gelled by combining 20 parts of the product of Example B with 80 parts of toluene and stirring for ten minutes. The resultant semi-solid gel had a penetration of 300 units when measured on a penetrometer with a standard grease cone. It was useful as a gelled fluid, and as a means of obtaining the solvent action of toluene without the liquidity thereof.

*Example D.*—Twenty parts each of benzene, ethanol and ethylene dichloride was mixed with 60 parts of toluene containing 15 parts of the product of Example B. The resulting mixture was a gelled paint remover possessing proper gel character.

*Example E.*—The product of Example 3 was suspended in a small amount of denatured ethyl alcohol. The alcohol was then displaced with a 200 SUS solvent-refined mineral oil, VI–95, by addition of the oil and working with a spatula. A series of samples was prepared at various solids concentrations and the viscosity measured at 75° F. by means of a Stormer viscosimeter. The following results were obtained.

| Percent of product of Example 3: | Viscosity, centipoises, @ 75° F. |
|---|---|
| 0 | 61 |
| 1.3 | 101 |
| 2.0 | 138 |
| 2.5 | 171 |

The bodied oils thus prepared were usable as lubricants, and showed improved viscosity indices.

*Example F.*—A high melting point wax containing 2½ grams of the product of Example 3 in 9 grams of paraffin wax (melting point: 125–130° F.) was prepared by suspending the solid in 10 grams of toluene, adding the molten paraffin, heating above the boiling point of the toluene and then passing over a three-roll paint mill. The product had a melting point above 350° F., retained the waxy character of the original paraffin, and showed marked increase in tensile strength.

*Example G.*—8% of the product of Example 1 is mixed with 92% gasoline. A gelled fuel is produced which burns with a 100% ignition loss, that is, none of the products of combustion is a solid.

*Example H.*—Sash putty was made up in accordance with the following formulation: To 1000 parts of whiting were added 2.3 parts by weight of the product of Example 3 hereinabove, together with 114 parts per weight of raw linseed oil, 6 parts per weight of mineral spirits and 5 parts of liquid drier corresponding with Federal Specification TT–D–651, type 1. A good putty resulted of excellent working properties, and slightly grayish color, and particularly characterized by its property of retaining oil, i.e., it was non-bleeding.

*Example I.*—Black typographic ink was made up having the following composition:

| | Sample | Control |
|---|---|---|
| Carbon black, "Peerless" | 92.6 | 100 |
| Product of Example 3 hereinabove | 7.4 | |
| Heat-bodied linseed oil Z–2 | 43.6 | 43.6 |
| Heat-bodied linseed oil Z–5 | 10.9 | 10.9 |
| Mineral spirits No. 6 | 45.5 | 45.5 |

The Stormer consistency of the ink was 745 grams, compared with 352 for the control. When the results of consistency tests made with a Brookfield instrument at different r.p.m.'s were plotted against apparent viscosity, the ink containing the graphitic oxide derivative showed a much greater thixotropic area than that of the control, which is of course desirable in the particular type of ink under consideration.

*Example J.*—A semi-gloss enamel was made up in accordance with the following formulation:

| | Sample | Control |
|---|---|---|
| Percent Pigment: | | |
| Titanium dioxide | 61.9 | 62.5 |
| Precipitated calcium carbonate | 31.0 | 31.3 |
| Diatomaceous silica | 6.2 | 6.2 |
| Product of Example 3 hereinabove | 0.9 | |
| Percent Vehicle: | | |
| Syntex 70 [1] | 70.8 | 70.8 |
| Mineral spirits No. 5 | 28.0 | 28.0 |
| Lead drier | 0.6 | 0.6 |
| Cobalt drier | 0.4 | 0.4 |
| Anti-skinning agent [2] | 0.2 | 0.2 |
| Composition of Paint: | | |
| Percent Pigment | 48.4 | 48.2 |
| Percent Vehicle | 51.6 | 51.8 |
| Percent Volatile in Vehicle | 54.0 | 54.0 |

[1] A 65% dispersion in mineral spirits of a soya-phthalic anhydride alkyd resin.
[2] E.g., orthoamylphenol of methyl pyrocatechin.

The sample paint made up had the following properties compared with that of the control, which, as will be seen from the above, did not contain any of the graphitic oxide compound prepared as described in Example 3 hereinabove:

| | Sample | Control |
|---|---|---|
| Consistency 0 days, Krebs units | 90 | 72 |
| Consistency 2 months, Krebs units | 97 | 76 |
| 60° Gloss | 39 | 87 |
| Hunter Reflectometer, Green Filter | 0.668 | 0.856 |

With reference to the compounds of graphitic oxide prepared in accordance with the invention, it may be stated that they are organophilic, which word is in current general use to describe materials compatible with, dispersible in, and often swelling in, organic systems as distinguished from inorganic aqueous systems, and the antonym of which is "hydrophilic." Thus, graphitic oxide itself is strongly hydrophilic, and organophobic, whereas the products e.g. of Examples 1–12 hereinabove are strongly organophilic and hydrophobic.

It will be appreciated that the invention is a broad one, and many modifications may be made in the composition and preparation of the graphitic oxide derivative as well as in the manner of using the derivatives which are prepared all within the scope of the invention and of the claims which follow.

It will be evident that a simple particle of graphitic oxide may be represented by the formula $C_nO_mH_p$, where $n:m$ is the molar carbon-to-oxygen ratio, which varies for good samples of graphitic oxide between about 3.5 to about 2.1, and $n$ is the total number of carbon atoms in the single particle of graphic oxide. The value of $p$ is somewhat variable and not readily determined, but is probably not far different from $m$, and in any case always smaller. Considering the particle as a single molecule, its molecular weight is then $n \times 12 + m \times 16 + l \times 1.008$.

Where the graphitic oxide has been reacted with an organic compound in accordance with the invention, the product may be represented by the formula $C_nO_mH_{p-x}M_x$, where M is the organic compound, radical or cation attached, and $x$ varies with the degree of substitution, varying approximately in the range corresponding to 1 to 4 milliequivalents per gram of original graphitic oxide.

Because of the acid character of graphitic oxide, it is often termed graphitic acid in the literature. When it is neutralized by a cation other than hydrogen a salt naturally results which can be termed a salt of graphitic oxide, or a salt of graphitic acid, or more simply a graphitate. Thus, when graphitic oxide is neutralized with sodium hydroxide the resulting compound can be termed sodium graphitate. If the graphitic salt is neutralized with an onium compound in accordance with this invention, say for example, hexadecylammonium bromide, then the resulting compound may be properly termed hexadecylammonium graphite. Similarly, the reaction product with the dodecylammonium cation is dodecylammonium graphitate; that with octadecylammonium cation is octadecylammonium graphitate; that with dimethyldioctadecylammonium cation is dimethyldioctadecylammonium graphitate, and similarly for the other salt-like compounds of the invention.

What I claim is:
1. Dodecylammonium graphitate.
2. Octadecylammonium graphitate.
3. Dimethyldioctadecylammonium graphitate.
4. Abietylammonium graphitate.

References Cited in the file of this patent

UNITED STATES PATENTS

| | | |
|---|---|---|
| 1,137,373 | Aylsworth | Apr. 27, 1915 |
| 2,130,947 | Carothers | Sept. 20, 1938 |
| 2,386,804 | Laliberte | Oct. 16, 1945 |
| 2,570,990 | Southern et al. | Oct. 9, 1951 |
| 2,574,510 | Thurston et al. | Nov. 13, 1951 |
| 2,622,987 | Ratcliffe | Dec. 23, 1952 |
| 2,798,878 | Hummers | July 9, 1957 |

OTHER REFERENCES

Beckett et al.: J. Phys. Chem., vol. 56, pp. 929, 930, 934, 935 (1952).